United States Patent
Ng

(10) Patent No.: US 8,522,030 B2
(45) Date of Patent: Aug. 27, 2013

(54) VERIFICATION AND PROTECTION OF GENUINE SOFTWARE INSTALLATION USING HARDWARE SUPER KEY

(75) Inventor: Patrick Ng, Elk Grove, CA (US)

(73) Assignee: Intel Corporation, Santa Clara, CA (US)

( * ) Notice: Subject to any disclaimer, the term of this patent is extended or adjusted under 35 U.S.C. 154(b) by 298 days.

(21) Appl. No.: 12/890,304

(22) Filed: Sep. 24, 2010

(65) Prior Publication Data

US 2012/0079277 A1    Mar. 29, 2012

(51) Int. Cl.
*H04L 9/32* (2006.01)

(52) U.S. Cl.
USPC .......................... 713/171; 713/191; 717/176

(58) Field of Classification Search
USPC .................................................. 713/171, 191
See application file for complete search history.

(56) References Cited

U.S. PATENT DOCUMENTS

| | | | |
|---|---|---|---|
| 8,266,062 B2* | 9/2012 | Mishra ............................. | 705/59 |
| 2003/0061487 A1* | 3/2003 | Angelo et al. ................. | 713/176 |
| 2005/0182732 A1* | 8/2005 | Miller et al. .................... | 705/59 |
| 2007/0143228 A1* | 6/2007 | Jorden et al. .................... | 705/71 |
| 2011/0072274 A1* | 3/2011 | Leoutsarakos et al. ....... | 713/182 |

\* cited by examiner

*Primary Examiner* — Jeffrey Pwu
*Assistant Examiner* — Jayesh Jhaveri
(74) *Attorney, Agent, or Firm* — Schwabe, Williamson & Wyatt, P.C.

(57) ABSTRACT

A device, system, and method are disclosed. In one embodiment the device receives a user key from a user application. The device then creates a management engine key by applying a management engine key creation algorithm to the user key. Then the device sends the management engine key to a remote server. Later, the device retrieves a server key from the remote server. The device next performs a hash combination of the user key, the management engine key, and the server key to create a super key. Once the super key has been created, the device authenticates the super key, and if the super key is valid, the device then sends a management engine certification to the user application.

24 Claims, 3 Drawing Sheets

VERIFICATION AND PROTECTION OF GENUINE SOFTWARE INSTALLATION USING HARDWARE SUPER KEY

FIELD OF THE INVENTION

The invention relates to verifying and protecting the software installation process.

BACKGROUND OF THE INVENTION

There are millions of dollars of lost revenue each year because software is being illegally copied and installed on personal computers worldwide. Software license keys attempt to curb this piracy, but they are vulnerable to malicious users (e.g., hackers) who are able to unlock the software security features regularly. Additionally, independent software vendors do not have the capability to verify whether software installed on an end user computer system is genuine rather than hacked. Software upgrades that are performed online are vulnerable and can lead to the unintended consequence of malware installations that piggyback on the software installations.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Elements of an apparatus, system, method, and machine-readable medium to verify and protect a genuine software installation using a hardware super key are disclosed.

Figure 1:
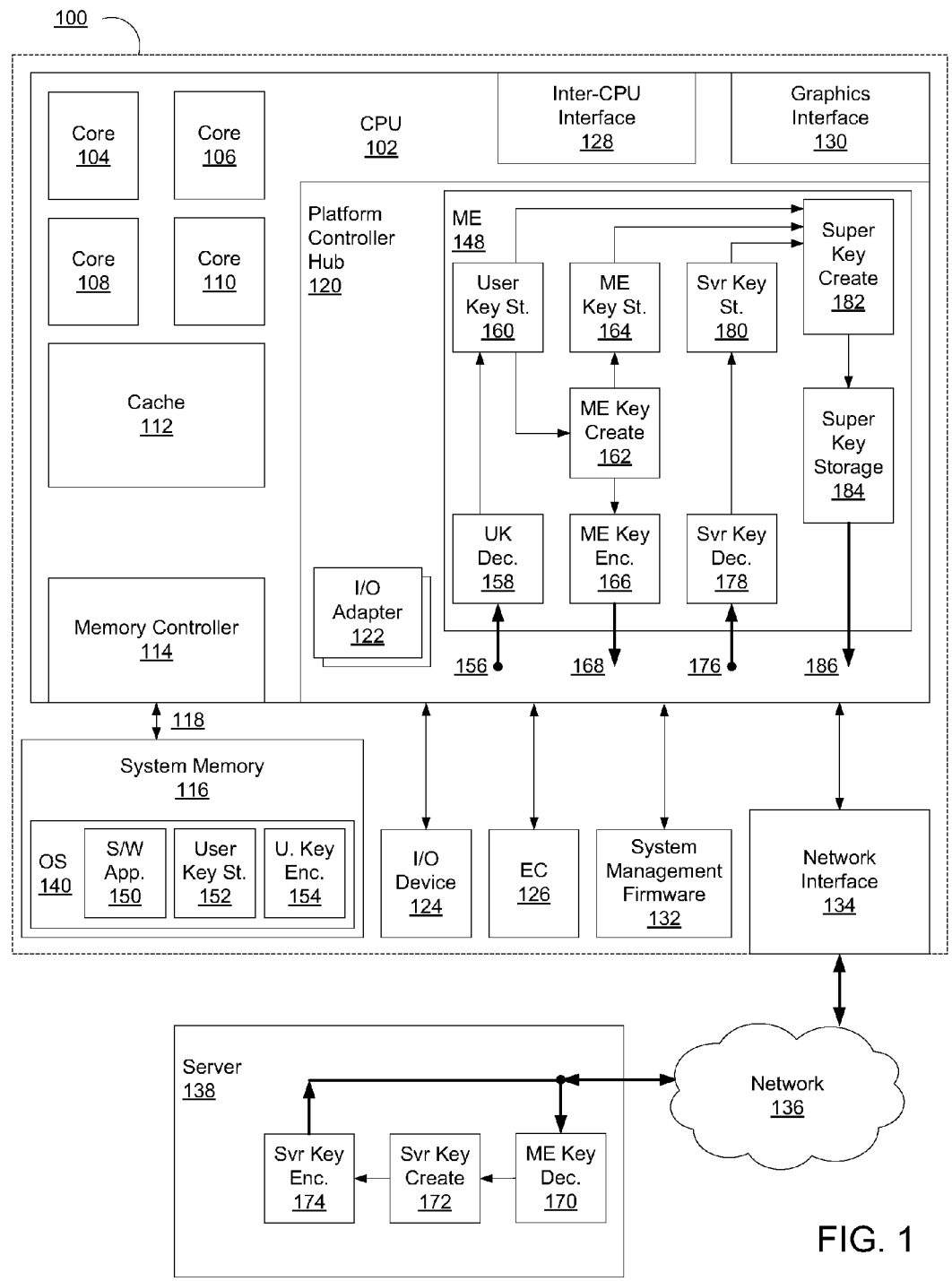
FIG. 1 illustrates an embodiment of a computer system capable of dynamically replacing memory segments using address swapping.

FIG. 1 illustrates an embodiment of a computer system capable of dynamically replacing memory segments using address swapping.

Computer system 100 is shown. The computer system may be a desktop, server, workstation, laptop, handheld, television set-top, media center, game console, integrated system (such as in a car), or other type of computer system. In several embodiments the computer system 100 includes one or more central processing units (CPUs), also referred to as "processors." Although in many embodiments there are potentially many CPUs, in the embodiment shown in FIG. 1 only CPU 102 is shown for clarity. CPU 102 may be an Intel® Corporation CPU or a CPU of another brand. CPU 102 includes one or more cores in different embodiments. CPU 102 is shown including four cores (Cores 104, 106, 108, and 110).

In many embodiments, each core includes internal functional blocks such as one or more execution units, retirement units, a set of general purpose and specific registers, etc. In a single-threaded core, each core may be referred to as a hardware thread. When a core is multi-threaded or hyper-threaded, then each thread operating within each core may also be referred to as a hardware thread. Thus, any single thread of execution running in the computer system 100 may be referred to as a hardware thread. For example, in FIG. 1, if each core is single-threaded, then there are four hardware threads present in the system (four cores). On the other hand, if each core is multi-threaded and has the capability of maintaining the states of two threads simultaneously, then there are eight hardware threads present in the system (four cores with two threads per core).

CPU 102 may also include one or more caches, such as cache 112. In many embodiments that are not shown, additional caches other than cache 112 are implemented so that multiple levels of cache exist between the execution units in each core and memory. In different embodiments cache 112 may be apportioned in different ways. Additionally, cache 112 may be one of many different sizes in different embodiments. For example, cache 112 may be an 8 megabyte (MB) cache, a 16 MB cache, etc. Additionally, in different embodiments the cache may be a direct mapped cache, a fully associative cache, a multi-way set-associative cache, or a cache with another type of mapping. In many embodiments, cache 112 may include one large portion shared among all cores or may be divided into several separately functional slices (e.g., one slice for each core). Cache 112 may also include one portion shared among all cores and several other portions that are separate functional slices per core.

In many embodiments, CPU 102 includes an integrated system memory controller 114 to provide an interface to communicate with system memory 116. In other embodiments that are not shown, memory controller 114 may be located in a discrete component, separate from CPU 102, elsewhere in computer system 100.

System memory 116 may comprise several dynamic random access memory (DRAM) devices, such as a type of double data rate (DDR) DRAM. The system memory may be coupled directly to a motherboard through solder or other connections or it may be coupled to the motherboard through one or more dual inline memory modules (DIMM) or other similar memory module.

System memory 116 may be a general purpose memory to store data and instructions to be operated upon by CPU 102. Additionally, there may be other potential devices within computer system 100 that have the capability to read and write to the system memories, such as a direct memory access (DMA)-capable I/O (input/output) device.

The link 118 (i.e., bus, interconnect, etc.) that couples CPU 102 with system memory 116 may include one or more optical, metal, or other wires (i.e. lines) that are capable of transporting data, address, control, and clock information.

Platform controller hub (PCH) 120 (e.g., a complex of I/O controller and other circuitry) includes an I/O interface that enables communication between the CPU 102 and external I/O devices. The hub may include one or more I/O adapters, such as I/O adapter 122. I/O adapters translate a host communication protocol utilized within the CPU 102 to a protocol compatible with a particular I/O device, such as I/O device 124. Some of the protocols that a given I/O adapter may translate include a Peripheral Component Interconnect (PCI)-Express protocol, Universal Serial Bus (USB), Serial Advanced Technology Attachment (SATA) interface, Ethernet, and 1394 "Firewire," among others. Additionally, there may be one or more wireless protocol I/O adapters. Examples of wireless protocols are Bluetooth, IEEE 802.11-based wireless protocols, and cellular protocols, among others.

Apart from I/O devices, the PCH 120 also may be coupled to one or more embedded controllers (ECs) in the system, such as EC 126. EC 126 may incorporate a number of functions. For example, a RAID storage controller device may be present within computer system 100. The RAID controller may manage an array of hard disk drives or solid state disks (SSDs). Other examples of the controller device may be a discrete out-of-band manageability engine, a keyboard controller, or another type of controller.

In other embodiments, PCH 120 is a discrete device located externally to the CPU 102. In these embodiments, an interface such as a direct memory interface (DMI) or another similar interface couples the CPU to the PCH. Though, these embodiments are not shown.

Inter-CPU interface 128 may provide an interface to a link coupled to one or more additional CPUs and allow inter-CPU communications to take place. E.g., Inter-CPU high-speed interface may be a Quick Path Interconnect (QPI) or other similar interface. Although additional CPUs are not shown in FIG. 1, in many embodiments CPU 102 is one of multiple CPUs present within computer system 100. In many embodiments, Inter-CPU interface 128 provides a point-to-point high-speed communication interface between CPU 102 and each of the other CPUs present in the system.

Graphics interface 130 may provide an interface to a link coupled to a discrete graphics controller (a discrete graphics controller is not shown). The interface may be a high-speed platform component interconnect (PCI)-Express interface or another high-speed interface. In other embodiments, CPU 102 includes an integrated graphics controller and graphics interface 144 may be coupled to a display device, such as a monitor. In many embodiments, the interface is high-speed to allow for significant graphical data traffic to be transferred across the link (e.g., 3D graphics, video, etc.).

The computer system 100 also includes a system management firmware 132 to provide boot instructions to initialize the computer system and components. In different embodiments, system management firmware may be a basic input/ouput system (BIOS), an extendible firmware, or another form of firmware instructions the computer system may utilize during the boot of the platform.

Additionally, computer system 100 includes a network interface 134. Net work interface 134 may comprise a network interface controller to facilitate communication between CPU 102 and one or more entities external to computer system 100. For example, network interface 134 may be coupled to network 136 and network 136 may be coupled directly or indirectly to one or more servers, such as server 138, or other types of computers. Network 136 may be a localized server within a business intranet or potentially a non-related remote server at some location on the Internet, or any one of many other server embodiments.

The computer system 100 runs an operating system (OS) to manage the present hardware and software applications, in many embodiments. For example, OS 140 may be loaded into system memory 116 during the boot process of the computer system 100 and run while the computer system 100 is operational. In different embodiments, OS 140 may be a Microsoft® Windows®-based OS, a Linux-based OS, or any other type of OS.

Additionally, in many embodiments, the PCH 120 may include a manageability engine (ME) 148 that provides out-of-band (OOB) management for critical computer system functions, such as system management firmware 132 updates, secure measurement and verification processes to authenticate software and/or hardware components running within the system or communicating with the system, and power management related functionality, among others. The ME 148 may be operable when the computer system 100 is fully powered as well as when the computer system 100 is in several low power states. This many power state communication ability by the ME 148 enables information technology (IT) administrators or other similar administration to communicate with the computer system 100 when the system would otherwise be incommunicable. In other embodiments that are not shown, the ME 148 is located externally from the PCH 120. In some of these embodiments that are not shown, the ME 148 is a discrete chip coupled to the computer system 100 motherboard. In other embodiments, the ME 148 is integrated in the PCH 120, but the PCH 120 is located externally from CPU 102.

In many embodiments, a software application may be installed in the computer system 100 using an installation program. The software application may require a hardware key certification from the ME 148 to allow full installation. Hardware key certification has the capability to perform a more rigorous security check that the key is valid rather than being spoofed or otherwise circumvented by a malicious entity. What follows is the explanation of a process performed by software within the OS 140, hardware within the ME 148 as well as hardware within a remote server 138 to create a "super key" that, when created, grants the ME 148 the right to send an authentic software certification notifying the software that a user key entered during installation of the software application is valid, which will allow the software application installation to complete.

The software application 150 may be running as a program at the OS 140 layer (e.g., at the same trust level as the general application ring level in the OS 140). At some point during installation, the software application requests an installation key. The key, referred to as the user key, may be any form of alphanumeric key that could be entered automatically using a script or other such software mechanism or manually by a user typing in the key. Once the user key has been entered, it is stored into a temporary or permanent user key storage location 152 by the OS 140.

In some embodiments, a user key encryption algorithm 154 encrypts the user key into an encrypted user key. This encryption may be any feasible encryption scheme to mask the identity of the user key 152. For example, in some embodiments, RSA encryption is utilized to encrypt the user key into an encrypted user key. In many embodiments, a first encryption key in an encryption algorithm is utilized to encrypt the user key. In order to decrypt the user key, the first encryption key and the encryption algorithm must be known.

Once the user key has been encrypted by the user key encryption algorithm 154, the OS 140 (e.g., or the installation program running on the OS 140) sends the encrypted user key to the ME 148. The encrypted user key enters the ME 148 at entry point 156 and is received by a user key decryption algorithm 158 within the ME 148. The user key decryption algorithm 158 has access to the first encryption key and algorithm used to encrypt the user key by the user key encryption algorithm 154.

When the encrypted user key is decrypted within the ME 148 using the user key decryption algorithm 158 along with the first encryption key, the original user key is obtained. This user key is then stored in user key storage 160. The user key storage 160 provides the user key to a ME key creation algorithm 162. The ME key creation algorithm, in many embodiments, hashes the user key with an additional ME hash key to create a unique checksum value of the hashed user key that is referred to as the "ME key." The newly created ME key is first stored in ME key storage location 164 and a copy of the ME key is encrypted using an ME key encryption algorithm 166. The ME key encryption algorithm 166 utilizes a second encryption key to encrypt the newly created ME key. This encrypted ME key is then sent by the ME 148 externally through exit point 168, through network interface 134, and across network 136 to server 138.

Server 138 has knowledge of the second encryption key and the ME key encryption algorithm, which allows server 138 to decrypt the encrypted ME key into the original ME key by reversing the encryption algorithm using the second encryption key. Thus, ME key decryption algorithm 170 decrypts the received encrypted ME key from computer system 100 and obtains the original ME key.

In many embodiments, the server then utilizes the obtained ME key to run a lookup algorithm in a database. The set of valid ME keys are shown in the database. If someone else already had authenticated another installation of the program using the same user key, the ME key would tell the server 138 as such and the server may then decide to stop further key validation as the key is a known used key. Although the server 138 does not have full possession of the user key, the ME key, created from hashing the user key, can be utilized as an index lookup in a table of valid keys.

Instead of being an invalid ME key, for example, suppose the ME key is valid. If valid, server 138 then creates a server key using server key creation algorithm 172 by hashing the ME key with an additional server hash key to create a unique checksum value of the hashed ME key that is referred to as the "server key." The newly created server key is then encrypted by server key encryption algorithm 174 using a third encryption key. The encrypted server key is then sent back across network 136 to computer system 100. Within the ME 148, the encrypted server key is received at entry point 176 by an encrypted server key decryption algorithm 178. The server key decryption algorithm 178 has access to the third encryption key and algorithm used to encrypt the server key by the server key encryption algorithm 174 on the server 138.

When the encrypted server key is decrypted within the ME 148 using the server key decryption algorithm 178 along with the third encryption key, the original server key is obtained. This server key is then stored in server key storage 180.

At this point the ME 148 is storing the user key, the ME key, and the server key in user key storage 160, ME key storage 164, and server key storage 180, respectively. All three keys (i.e., the user key, the ME key, and the server key) are then combined to create a super key. More specifically, a super key creation algorithm, in many embodiments, hashes the user key, the ME key, and the server key together to create a unique checksum value of the combined hash of the three keys. This combined hash value (i.e., checksum) is referred to as the "super key." The newly created super key is then checked against a predetermined super key already stored in the ME 148 in super key storage 184. As a result, if the comparison matches, there is a confirmation that the input user key was valid. This validity is then sent in the form of a certification through ME 148 exit point 186 to the OS 140, which allows the software installation to complete in the case of a valid user key input at the start of the process.

In many embodiments, the user key, ME key, and server key are sent between the different origination and destination logic modules (i.e., user app./OS, ME, and server) utilizing an OOB communication channel.

Figure 2:
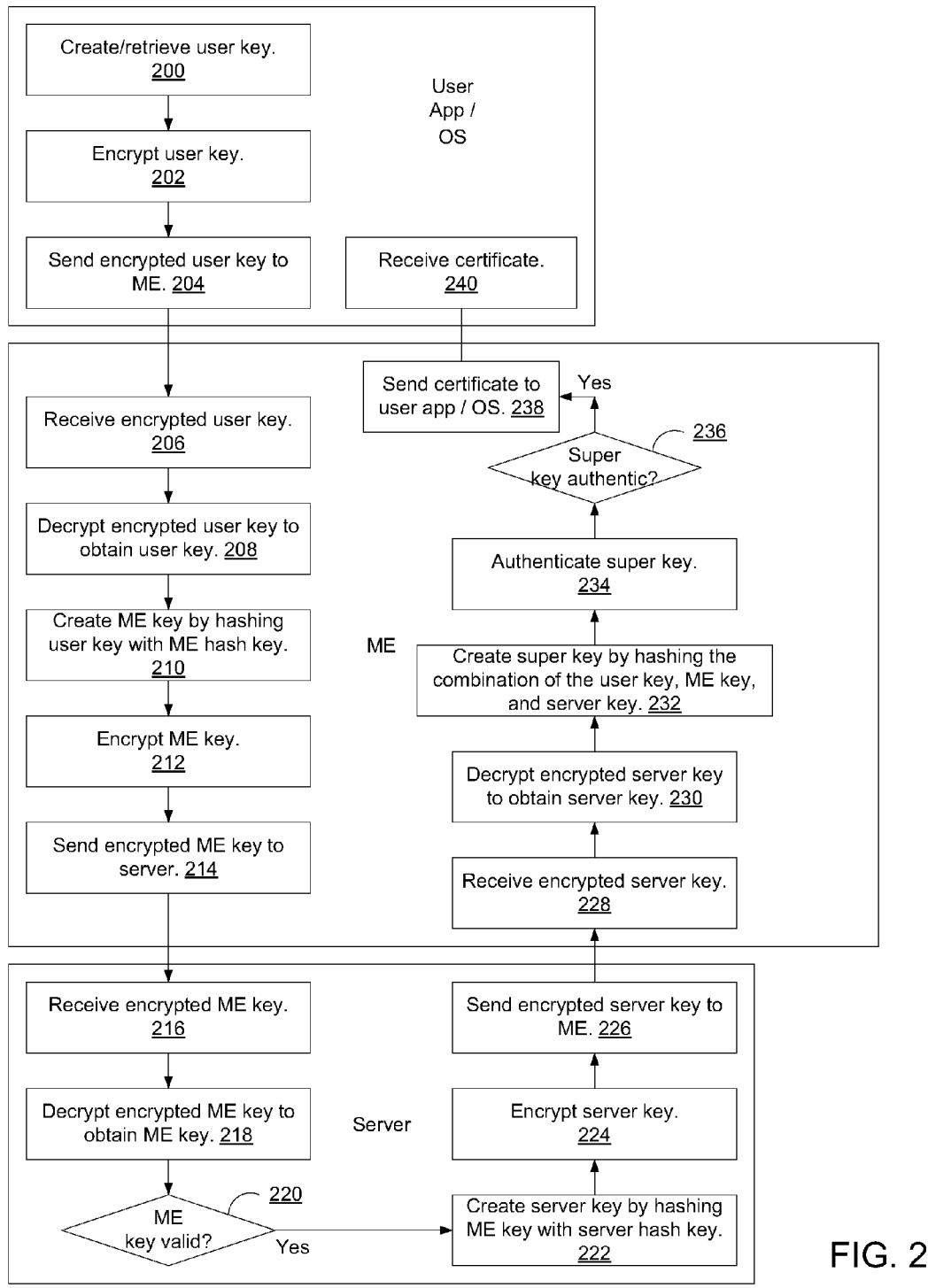
FIG. 2 is a flow diagram of an embodiment of a process to verify and protect a genuine software installation utilizing a hardware super key with implemented encryption.

FIG. 2 is a flow diagram of an embodiment of a process to verify and protect a genuine software installation utilizing a hardware super key with implemented encryption.

The process is performed by processing logic that may include software applications, firmware code, hardware circuitry, or a combination of any of the listed forms of processing logic.

The process begins by processing logic in a user application and/or OS to create or retrieve a user key (processing block 200). The processing logic then encrypts the user key (processing block 202). Once encrypted, processing logic sends the encrypted user key to a management engine (ME) in the computer system (processing block 204).

Processing logic in the management engine receives the encrypted user key (processing block 206). Once received, processing logic decrypts the encrypted user key to obtain the user key (processing block 208). Then processing logic creates an ME key by hashing the user key with an ME hash key (processing block 210). As discussed above, the ME key creation algorithm may utilize any predetermined ME hash key to create the unique hash of the user key that results in the ME key.

Once the ME key is created, processing logic then encrypts the ME key (processing block 212). And when the ME key has been encrypted, processing logic will send the encrypted ME key to the server (processing block 214).

Processing logic in the server receives the encrypted ME key (processing block 216). Once received, processing logic decrypts the encrypted ME key to obtain the ME key (processing block 218). When processing logic has the ME key, it determines if the ME key is valid (processing block 220). The determination may be made by performing a lookup of the ME key in a database. The database may have all ME keys and the current status of each ME key (e.g., used, not used, etc.). If the ME key is not valid, the process stops and the server does not return a valid server key (which makes the super key invalid).

On the other hand, if the ME key is valid, then processing logic creates the server key by hashing the ME key with a ME hash key (processing block 222). Once the server key has been created, processing logic then encrypts the server key (processing block 224). Then processing logic sends the encrypted server key to the ME (processing block 226).

Processing logic in the ME receives the encrypted server key (processing block 228). Once received, processing logic then decrypts the encrypted server key to obtain the server key (processing block 230). At this point, processing logic in the ME has all three valid keys, the user key, the ME key, and the server key. Processing logic then hashes these three keys together to create a super key (processing block 232). Armed with the super key, processing logic then authenticates the super key (processing block 234). Authentication may be as simple as comparing the created super key with a version of the super key stored within the ME. In other embodiments, the ME requests authentication of the super key from a remote security server through a measured/secure communication.

The results of the authentication are received by processing logic and processing logic then determines if the super key is authentic (processing block 236). If the super key is found to not be authentic, processing logic stops further key verification and no certification is passed back to the user application to complete the install. But, if the super key is authentic, then processing logic in the ME sends a certificate to the user application or OS (processing block 238) to notify the user application or OS that the originally entered user key was valid and verified. Finally, processing logic in the user application or OS then receives the certificate (processing block 240) and the software installation may complete.

FIGS. 1 and 2 describe embodiments of a process that utilizes encryption during the super key creation process when communications are passed between modules (i.e., the user application/OS module logic, the ME module logic, and the server module logic).

Figure 3:
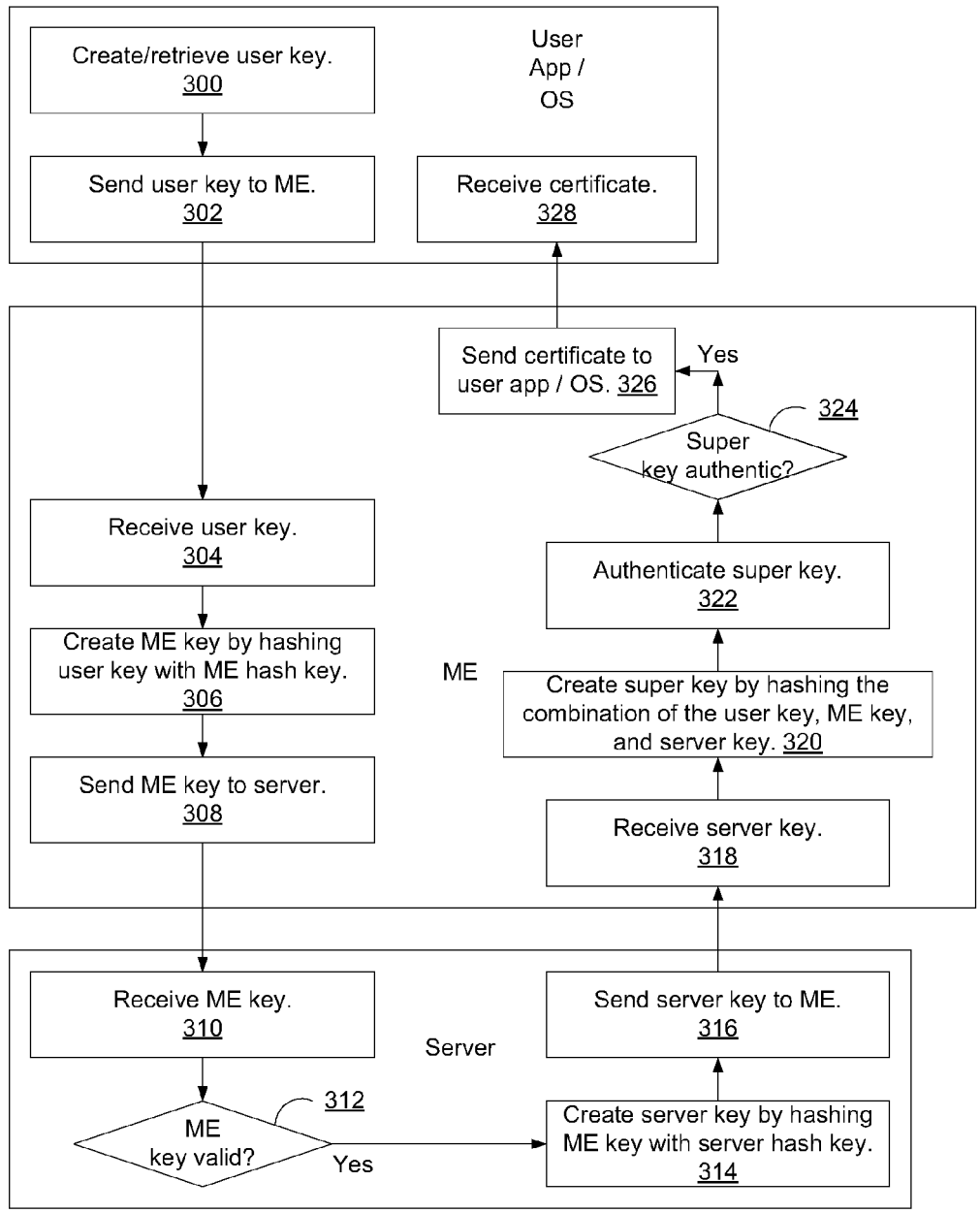
FIG. 3 is a flow diagram of an embodiment of a process to verify and protect a genuine software installation utilizing a hardware super key without implemented encryption.

FIG. 3, on the other hand, is a flow diagram of an embodiment of a process to verify and protect a genuine software installation utilizing a hardware super key without implemented encryption. Rather, in the embodiment shown in FIG. 3, each of the three keys (user key, ME key, and server key) are sent between modules in original form, which therefore does not require decryption. This process is less secure than the process in FIG. 2, but more streamlined with less encryption overhead.

The process is performed by processing logic that may include software applications, firmware code, hardware circuitry, or a combination of any of the listed forms of processing logic.

The process begins by processing logic in a user application and/or OS to create or retrieve a user key (processing block 300). The processing logic then sends the user key to a management engine (ME) in the computer system (processing block 302).

Processing logic in the management engine receives the user key (processing block 304). Once received, processing logic creates an ME key by hashing the received user key with an ME hash key (processing block 306). As discussed above, the ME key creation algorithm may utilize any predetermined ME hash key to create the unique hash of the user key that results in the ME key.

Once the ME key is created, processing logic then will send the ME key to the server (processing block 308).

Processing logic in the server receives the ME key (processing block 310). Once received, processing logic then determines if the ME key is valid (processing block 312). The determination may be made by performing a lookup of the ME key in a database. The database may have all ME keys and the current status of each ME key (e.g., used, not used, etc.). If the ME key is not valid, the process stops and the server does not return a valid server key (which makes the super key invalid). In other embodiments, the ME key may be put through a validation algorithm that determines if the key is genuine or made up.

If the ME key is valid, then processing logic creates the server key by hashing the ME key with a ME hash key (processing block 314). Once the server key has been created, processing logic sends the server key to the ME (processing block 316).

Processing logic in the ME receives the server key (processing block 318). Once received, processing logic then hashes these three keys together to create a super key (processing block 320). Armed with the super key, processing logic then authenticates the super key (processing block 322). Authentication may be as simple as comparing the created super key with a version of the super key stored within the ME. In other embodiments, the ME requests authentication of the super key from a remote security server through a measured/secure communication.

The results of the authentication are received by processing logic and processing logic then determines if the super key is authentic (processing block 324). If the super key is found to not be authentic, processing logic stops further key verification and no certification is passed back to the user application to complete the install. But, if the super key is authentic, then processing logic in the ME sends a certificate to the user application or OS (processing block 326) to notify the user application or OS that the originally entered user key was valid and verified. Finally, processing logic in the user application or OS then receives the certificate (processing block 328) and the software installation may complete.

The hashing algorithms discussed in the present invention may comprise one or more valid hash algorithms. For example, a SHA-1 hash algorithm may be utilized to create the checksum/hash results for each hash function. In other embodiments, one or more of any other valid hash algorithm is utilized for hashing purposes. In other embodiments altogether, another form of key creation algorithm is utilized instead of a hashing algorithm.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions.

In the description above and in the claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate, interact, or communicate with each other.

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a microcontroller, or the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The invention claimed is:

1. A controller, comprising:
an I/O interface configured to enable communication with the controller; and
a management engine including key storage memory, the management engine configured to:
retrieve a user key by applying a user key decryption algorithm to an encrypted user key received from a user application of an apparatus hosting the controller,
create a management engine key by applying a management engine key creation algorithm to the user key,
encrypt the management engine key by applying a management engine key encryption algorithm to the management engine key,
send the encrypted management engine key to a remote server,
retrieve a server key by applying a server key decryption algorithm to an encrypted server key received from the remote server,
perform a hash combination of the user key, the management engine key, and the server key stored in the key storage memory, to create a super key,
perform an authentication of the super key, and
send a management engine certification to the user application in response to the super key being successfully authenticated.

2. The controller of claim 1, further comprising:
a memory storage location to store at least a super key master value, wherein the super key is successfully authenticated when the hash combination value is equivalent to the super key master value.

3. The controller of claim 1, wherein the encrypted user key and the management engine certification are sent between the user application and the management engine via an out-of-band channel.

4. The controller of claim 1, wherein the management engine key and the encrypted server key are sent between the management engine and the remote server via an out-of-band channel.

5. The controller of claim 1, wherein the management engine key creation algorithm comprises a management engine cryptographic hash function, wherein the user key is input into the hash function and the management engine key is the resulting output of the hash function.

6. The controller of claim 1, further comprising:
memory storage locations to store at least the user key, the management engine key, and the server key.

7. A system, comprising:
a client device having a management engine, and a remote server
wherein the management engine is configured to
retrieve a user key by applying a user key decryption algorithm to an encrypted user key received from a user application,
create a management engine key by applying a management engine key creation algorithm to the user key,
encrypt the management engine key by applying a management engine key encryption algorithm to the management engine key,
send the encrypted management engine key to a remote server,
retrieve a server key by applying a server key decryption algorithm to an encrypted server key received from the remote server,
perform a hash combination of the user key, the management engine key, and the server key to create a super key,
perform an authentication of the super key, and
send a management engine certification to the user application in response to the super key being successfully authenticated; and
wherein the remote server is configured to
receive the encrypted management engine key from the management engine,
retrieve the management engine key by applying a management engine key decryption algorithm to the encrypted management engine key,
create a server key by applying a server key creation algorithm to the management engine key,
encrypt the server key by applying a server key encryption algorithm to the server key, and
send the encrypted server key to the management engine.

8. The system of claim 7, wherein the management engine further comprises a memory storage location to store at least a super key master value, wherein the super key is successfully authenticated when the hash combination value is equivalent to the super key master value.

9. The system of claim 7, further comprising:
an out-of-band channel to communicatively couple the management engine with the user application, wherein the encrypted user key and the management engine certification are sent between the user application and the management engine via the out-of-band channel.

10. The system of claim 7, further comprising:
an out-of-band channel to communicatively couple the management engine with the remote server, wherein the management engine key and the encrypted server key are sent between the management engine and the remote server via an out-of-band channel.

11. The system of claim 7, wherein the management engine key creation algorithm comprises a management engine cryptographic hash function, wherein the user key is input into the hash function and the management engine key is the resulting output of the hash function.

12. The system of claim 7, wherein the server key creation algorithm comprises a server cryptographic hash function, wherein the management engine key is input into the hash function and the server key is the resulting output of the hash function.

13. A method, comprising:
retrieving, using a computing device, a user key by applying a user key decryption algorithm to an encrypted user key received from a user application of the complain device;
creating, using the computing device, a management engine key by applying a management engine key creation algorithm to the user key;
encrypting, using the computing device, the management engine key by applying a management engine key encryption algorithm to the management engine key;
sending, using the computing device, the encrypted management engine key to a remote server;
retrieving, using the computing device, a server key by applying a server key decryption algorithm to an encrypted server key received from the remote server;
performing, using the computing device, a hash combination of the user key, the management engine key, and the server key to create a super key;
performing, using the computing device, an authentication of the super key; and
sending, using the computing device, a management engine certification to the user application in response to the super key being successfully authenticated.

14. The method of claim 13, further comprising:
storing at least a super key master value in a management engine, wherein the super key is successfully authenticated when the hash combination value is equivalent to the super key master value.

15. The method of claim 13, further comprising:
sending the encrypted user key and the management engine certification between the user application and the management engine via an out-of-band channel.

16. The method of claim 13, further comprising:
sending the management engine key and the encrypted server key between the management engine and the remote server via an out-of-band channel.

17. The method of claim 13, wherein the management engine key creation algorithm comprises a management engine cryptographic hash function, wherein the user key is input into the hash function and the management engine key is the resulting output of the hash function.

18. The method of claim 14, further comprising:
storing the user key, the management engine key, and the server key in separate storage locations in the management engine.

19. A controller, comprising:
an I/O interface configured to enable communication with the controller; and
a management engine including key storage memory, the management engine configured to:
receive a user key from a user application of an apparatus hosting the controller,
create a management engine key by applying a management engine key creation algorithm to the user key,
send the management engine key to a remote server,
retrieve a server key from the remote server,
perform a hash combination of the user key, the management engine key, and the server key stored in the key storage memory, to create a super key,
perform an authentication of the super key, and
send a management engine certification to the user application in response to the super key being successfully authenticated.

20. The controller of claim 19, further comprising:
a memory storage location to store at least a super key master value, wherein the super key is successfully authenticated when the hash combination value is equivalent to the super key master value.

21. The controller of claim 19, wherein the user key and the management engine certification are sent between the user application and the management engine via an out-of-band channel.

22. The controller of claim 19, wherein the management engine key and the server key are sent between the management engine and the remote server via an out-of-band channel.

23. The controller of claim 19, wherein the management engine key creation algorithm comprises a management engine cryptographic hash function, wherein the user key is input into the hash function and the management engine key is the resulting output of the hash function.

24. The controller of claim 19, further comprising:
memory storage locations to store at least the user key, the management engine key, and the server key.

* * * * *